US008068431B2

(12) United States Patent
Varadarajan et al.

(10) Patent No.: US 8,068,431 B2
(45) Date of Patent: Nov. 29, 2011

(54) SYSTEM AND METHOD FOR DEEP PACKET INSPECTION

(75) Inventors: Sridhar Varadarajan, Bangalore (IN); Srividya Gopalan, Bangalore (IN); Preethy Iyer, Bangalore (IN)

(73) Assignee: Satyam Computer Services Limited, Secunderabad (IN)

( * ) Notice: Subject to any disclaimer, the term of this patent is extended or adjusted under 35 U.S.C. 154(b) by 96 days.

(21) Appl. No.: 12/505,130

(22) Filed: Jul. 17, 2009

(65) Prior Publication Data
US 2011/0013527 A1    Jan. 20, 2011

(51) Int. Cl.
*H04L 12/26* (2006.01)
(52) U.S. Cl. ...................................................... 370/241
(58) Field of Classification Search .................. None
See application file for complete search history.

(56) References Cited

U.S. PATENT DOCUMENTS

| | | | |
|---|---|---|---|
| 5,787,253 | A  | 7/1998  | McCreery et al. |
| 6,591,299 | B2 | 7/2003  | Riddle et al. |
| 6,789,116 | B1 | 9/2004  | Sarkissian et al. |
| 7,017,186 | B2 | 3/2006  | Day |
| 7,143,442 | B2 | 11/2006 | Scarfe et al. |
| 2006/0212942 | A1 | 9/2006 | Barford et al. |
| 2006/0239219 | A1 | 10/2006 | Haffner et al. |
| 2008/0189784 | A1* | 8/2008 | Mangione-Smith et al. ... 726/23 |
| 2009/0070459 | A1* | 3/2009 | Cho et al. ...................... 709/224 |

OTHER PUBLICATIONS

G. Tripp, "A Finite-State-Machine Based String Matching System for Intrusion Detection on High-Speed Networks", appeared in the Proceedings of the 14th EICAR Annual Conference Saint Julians, Malta, Apr. 30-May 3, 2005.
C. Pruteanu, D. Galea, and C. Haba, "Applications of Finite State Machines General Decompositon Method with Optimization", appeared in the Proceedings of 8th International Conference on Development and Application Systems, Suceava, Romania, May 25-27, 2006.

* cited by examiner

*Primary Examiner* — Kevin C Harper
(74) *Attorney, Agent, or Firm* — Venable LLP; Jeffri A. Kaminski; Christopher Ma

(57) ABSTRACT

IP networks carry packets that consist of headers and payloads. Typical traffic analysis systems at layer 3 process packet headers in order to obtain as much information about the traffic as possible. However, performing of deep packet analysis requires the processing of packet payloads as well. Another important requirement of layer 3 processing is the need to process the payloads at wire speeds. A system and method for deep packet inspection at layer 3 involves (a) an approach for packet payload processing; (b) accounting for out of order arrival of packets; (c) an approach for partial match analysis so as to be able to analyze the traffic flows when only partial information is available; and (d) an approach for effective payload processing for attempting to achieve wire speed processing.

16 Claims, 14 Drawing Sheets

OVERVIEW OF SYSTEM ARCHITECTURE OF DPIL3 SYSTEM

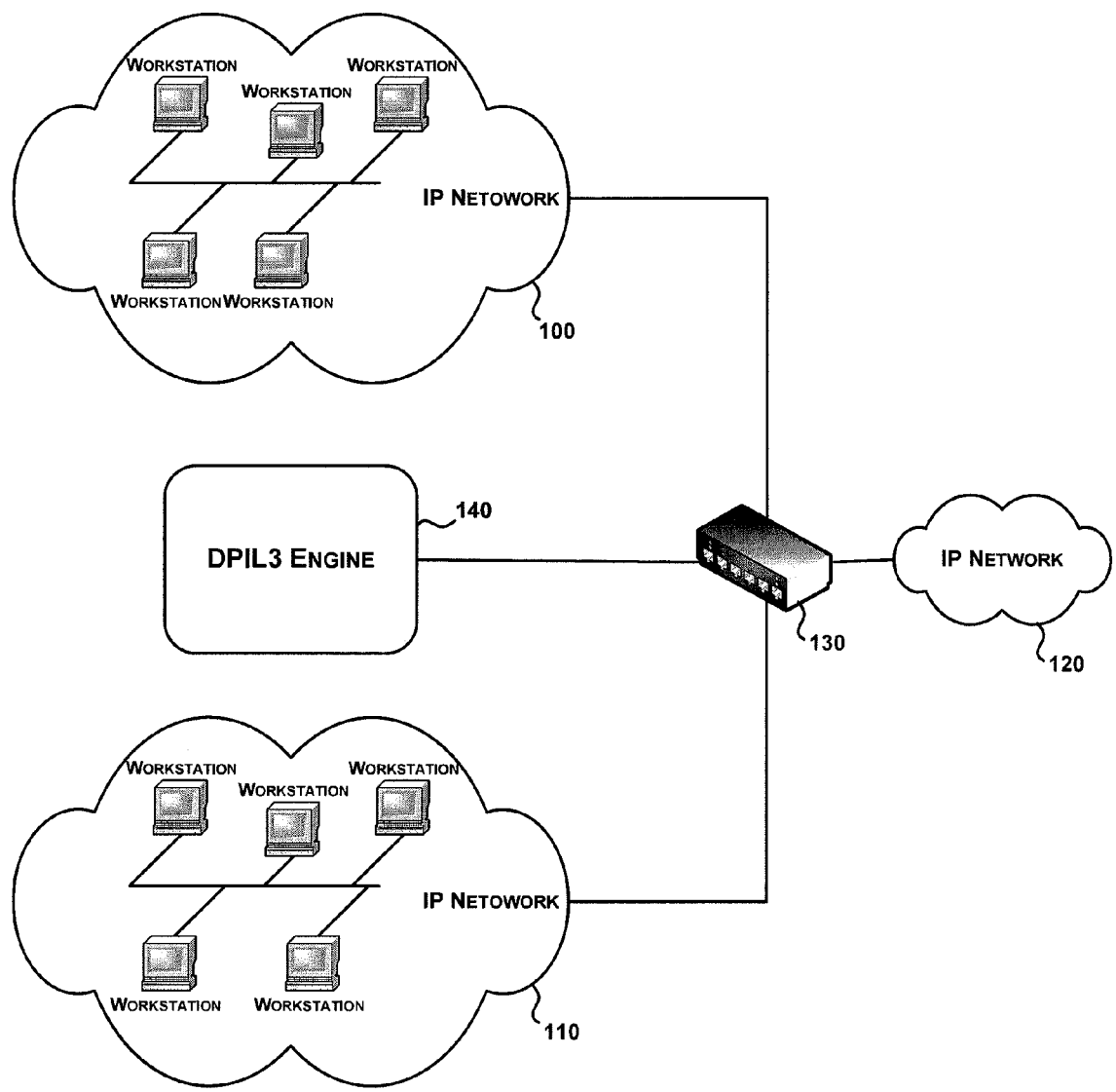
FIG. 1: OVERVIEW OF NETWORK ARCHITECTURE OF DPIL3 SYSTEM

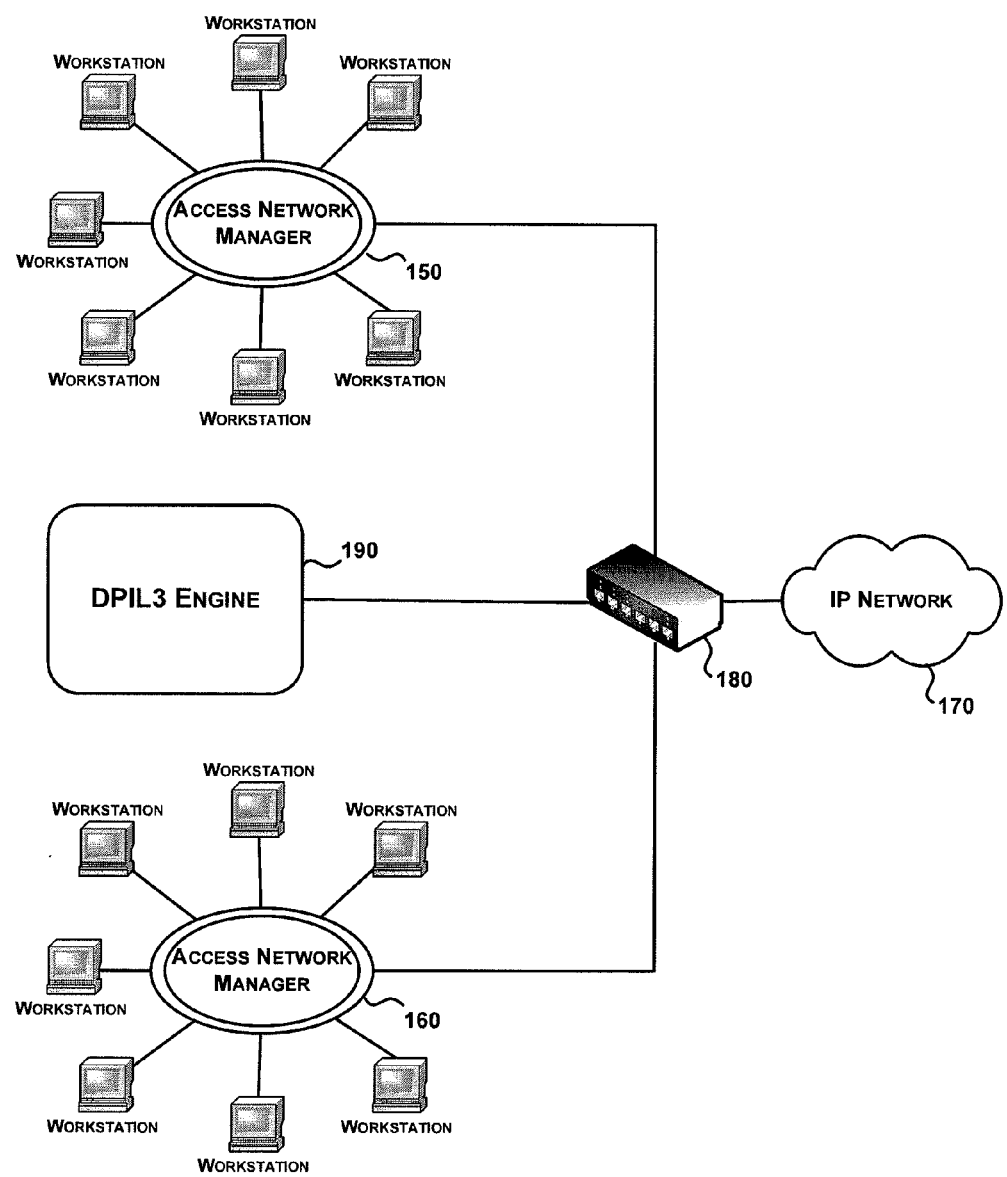
FIG. 1A: ANOTHER ILLUSTRATIVE NETWORK ARCHITECTURE OF DPIL3 SYSTEM

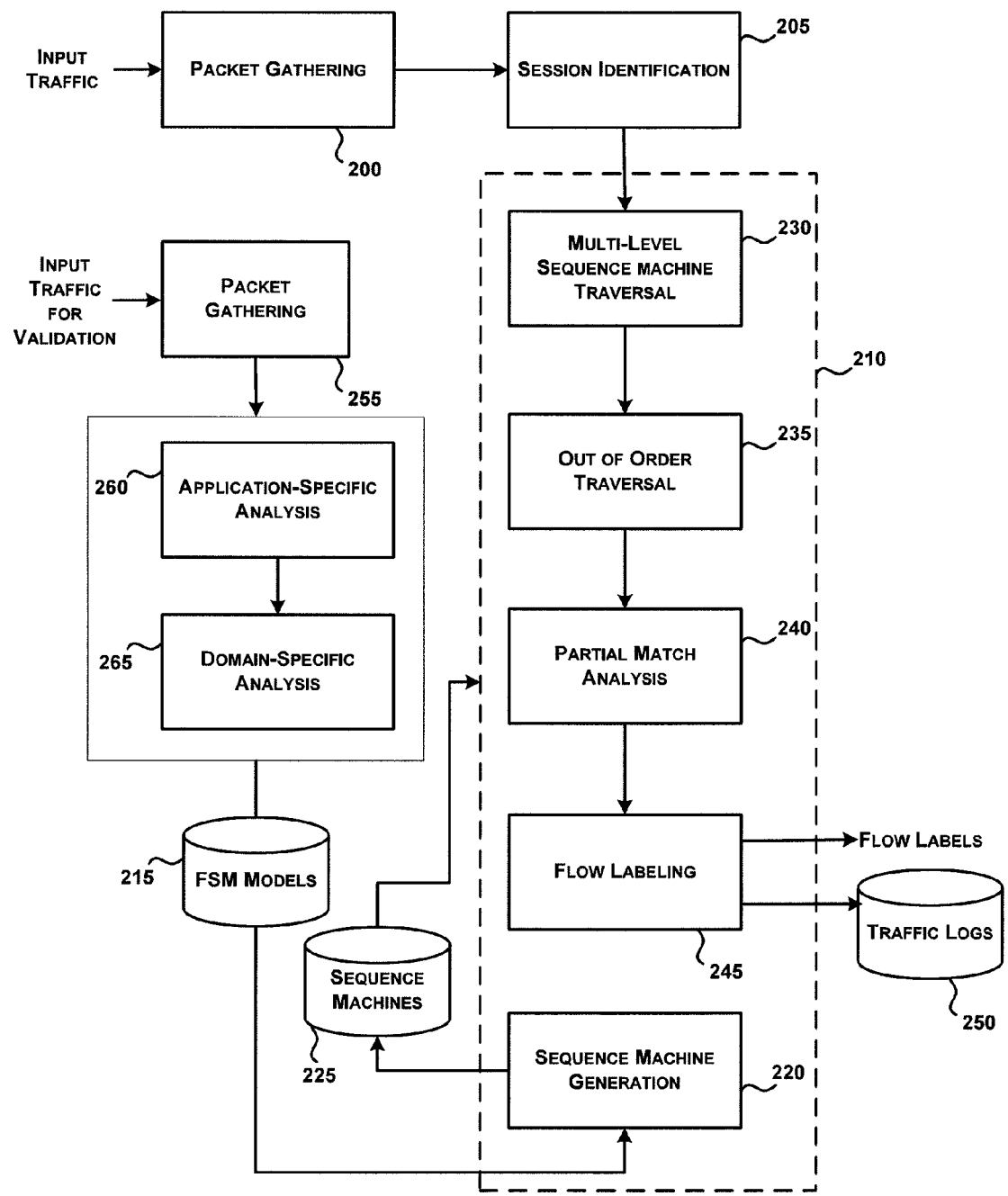
FIG. 2: OVERVIEW OF SYSTEM ARCHITECTURE OF DPIL3 SYSTEM

| <COMPANY NAME> | ((0,0), .8,1) | | BALANCE SHEET | ((0,1), .8,1) |
|---|---|---|---|---|
| ASSETS | ((1,0), .8,0) | | | |
| CURRENT ASSETS | ((2,0), .8,1) | <YEAR> ((2,1), .8,0) | <YEAR> | ((2,2), .8,0) |
| CASH | ((3,0), .8,1) | <AMOUNT> ((3,1), .8,1) | <AMOUNT> | ((3,2), .8,0) |
| INVESTMENTS | ((4,0), .5,0) | <AMOUNT> ((4,1), .5,0) | <AMOUNT> | ((4,2), .5,0) |
| INVENTORIES | ((5,0), .5,0) | <AMOUNT> ((5,1), .5,0) | <AMOUNT> | ((5,2), .5,0) |
| TOTAL CURRENT ASSETS | ((6,0), .8,1) | <AMOUNT> ((6,1), .8,1) | <AMOUNT> | ((6,2), .8,0) |
| FIXED ASSETS | ((7,0), .8,0) | | | |
| PROPERTY AND EQUIPMENT | ((8,0), .5,0) | <AMOUNT> ((8,1), .5,0) | <AMOUNT> | ((8,2), .5,0) |
| LEASEHOLD IMPROVEMENTS | ((9,0), .5,0) | <AMOUNT> ((9,1), .5,0) | <AMOUNT> | ((9,2), .5,0) |
| EQUITY AND OTHER INVESTMENTS | ((10,0), .5,0) | <AMOUNT> ((10,1), .5,0) | <AMOUNT> | ((10,2), .5,0) |
| TOTAL FIXED ASSETS | ((11,0), .8,1) | <AMOUNT> ((11,1), .8,1) | <AMOUNT> | ((11,2), .8,0) |
| TOTAL ASSETS | ((12,0), .8,1) | <AMOUNT> ((12,1), .8,1) | <AMOUNT> | ((12,2), .8,0) |
| LIABILITIES | ((13,0), .8,0) | | | |
| CURRENT LIABILITIES | ((14,0), .8,1) | <YEAR> ((14,1), .8,0) | <YEAR> | ((14,2), .8,0) |
| ACCOUNT PAYABLE | ((15,0), .5,0) | <AMOUNT> ((15,1), .5,0) | <AMOUNT> | ((15,2), .5,0) |
| ACCRUED WAGES | ((16,0), .5,0) | <AMOUNT> ((16,1), .5,0) | <AMOUNT> | ((16,2), .5,0) |
| INCOME-TAX PAYABLE | ((17,0), .5,0) | <AMOUNT> ((17,1), .5,0) | <AMOUNT> | ((17,2), .5,0) |
| TOTAL CURRENT LIABILITIES | ((18,0), .8,1) | <AMOUNT> ((18,1), .8,1) | <AMOUNT> | ((18,2), .8,0) |
| LONG-TERM LIABILITIES | ((19,0), .5,0) | | | |
| MORTGAGE PAYABLE | ((20,0), .5,0) | <AMOUNT> ((20,1), .5,0) | <AMOUNT> | ((20,2), .5,0) |
| TOTAL LONG-TERM LIABILITIES | ((21,0), .8,1) | <AMOUNT> ((21,1), .8,1) | <AMOUNT> | ((21,2), .8,0) |
| TOTAL LIABILITIES | ((22,0), .8,1) | <AMOUNT> ((22,1), .8,1) | <AMOUNT> | ((22,2), .8,0) |
| BALANCE | ((23,0), .8,1) | <AMOUNT> ((23,1), .8,1) | <AMOUNT> | ((23,2), .8,1) |

FIG. 3: AN ILLUSTRATIVE DOMAIN-SPECIFIC TEMPLATE

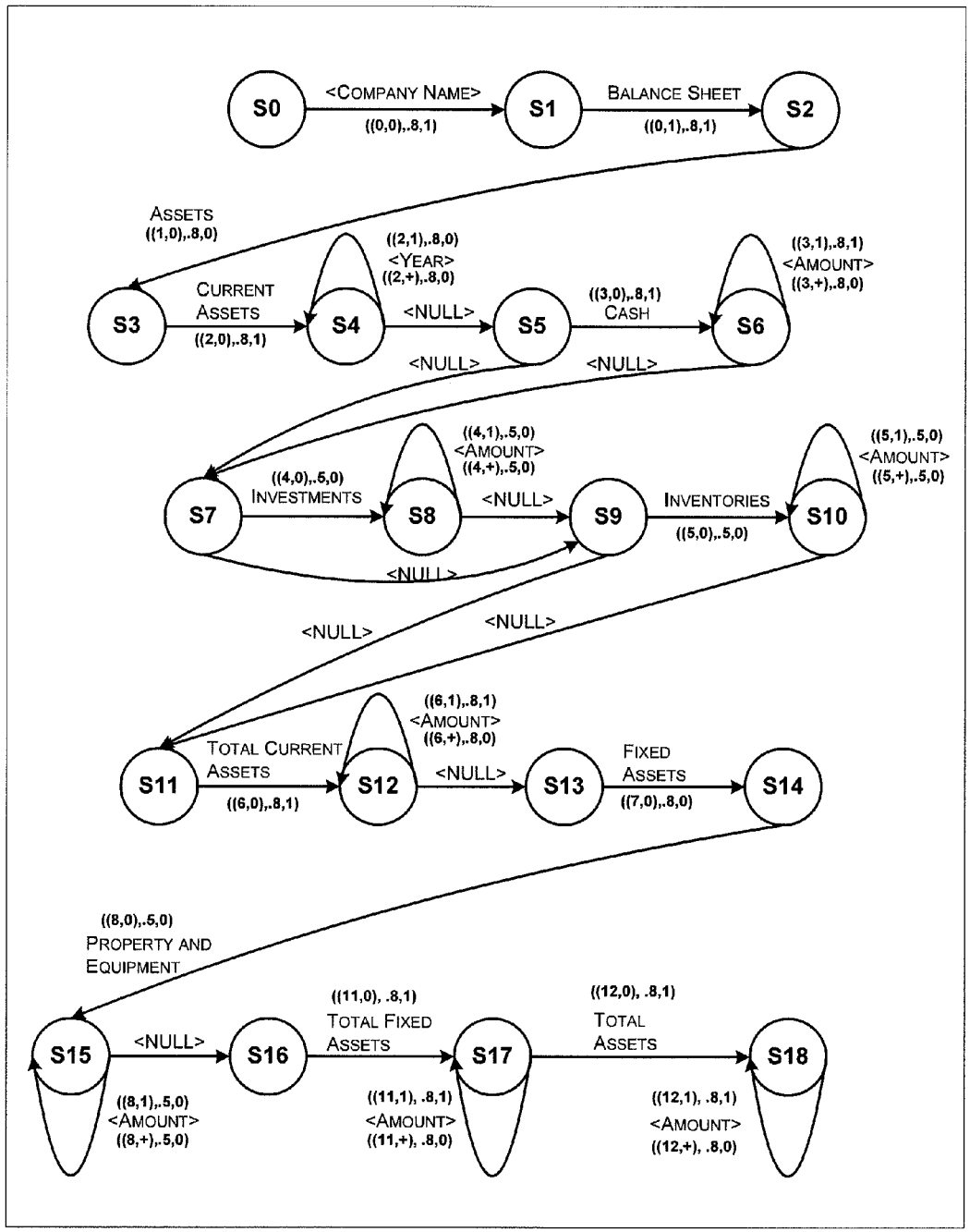
FIG. 3A: AN ILLUSTRATIVE FSM

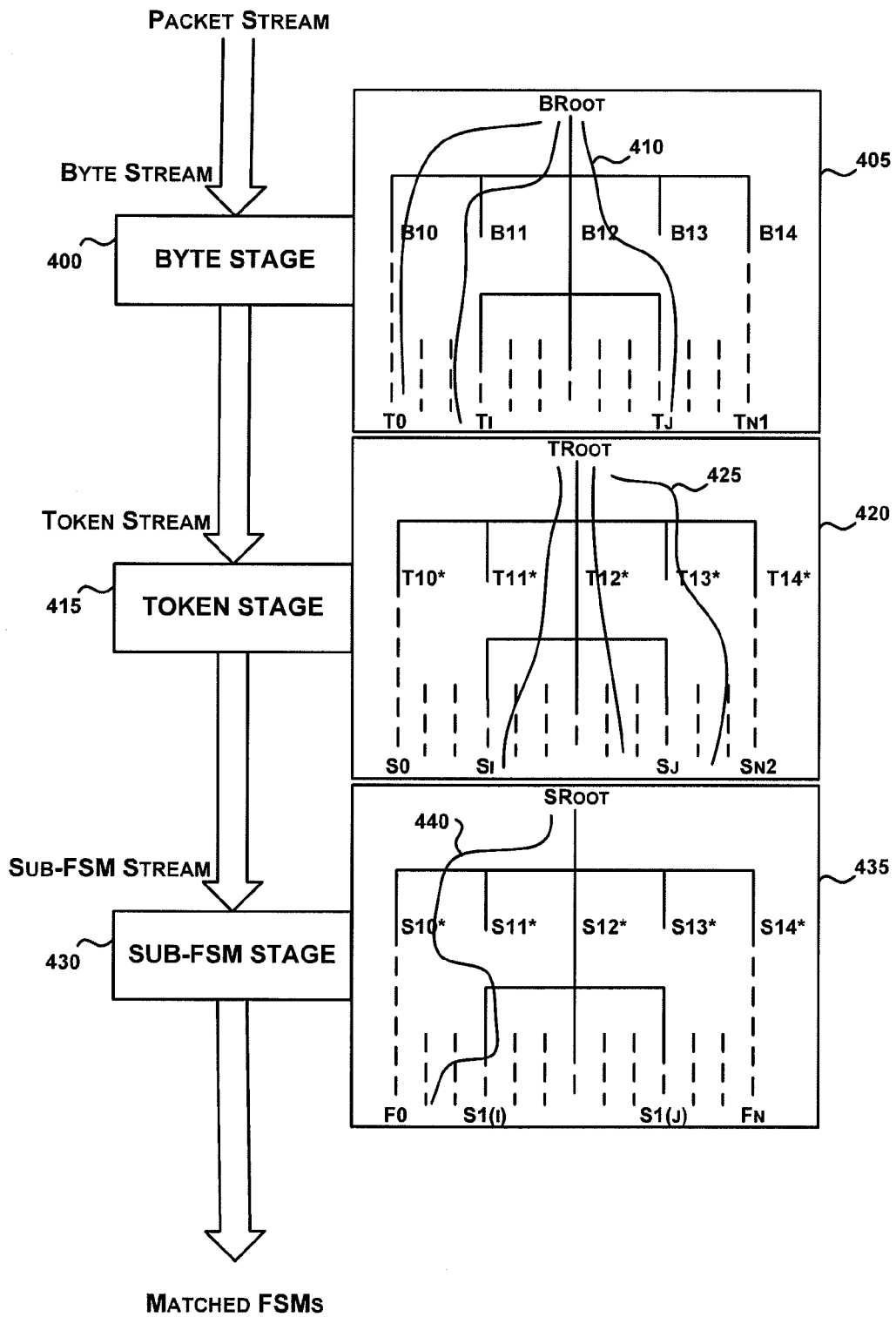
FIG. 4: AN ILLUSTRATIVE PACKET STREAM ANALYSIS

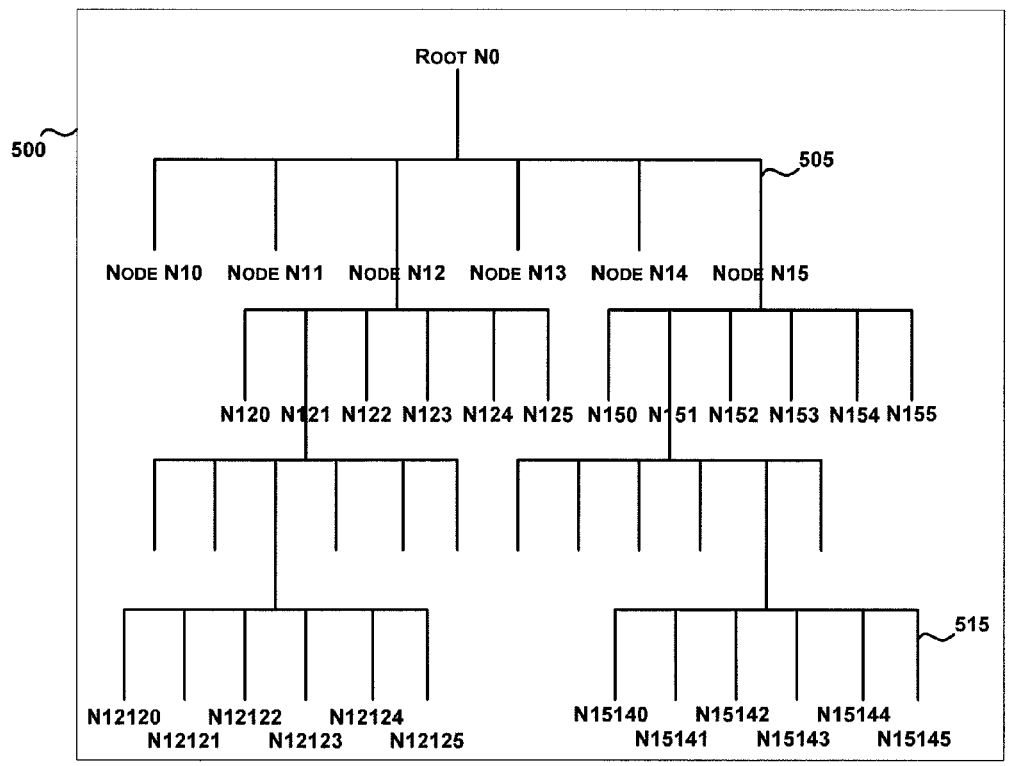
FIG. 5: ILLUSTRATIVE MULTI-LEVEL INDEXING

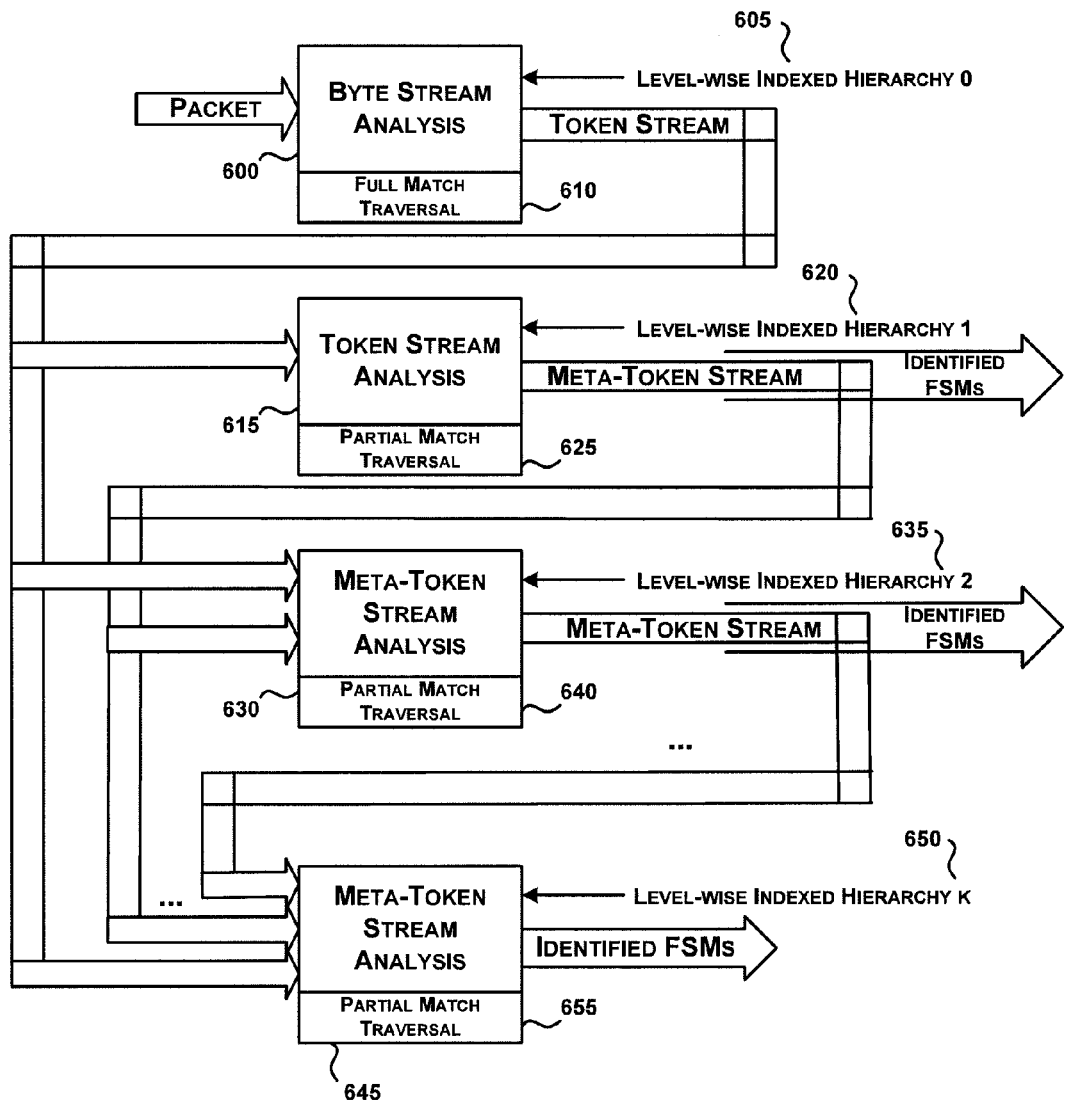
FIG. 6: MATCHING BASED ON MULTIPLE HIERARCHIES

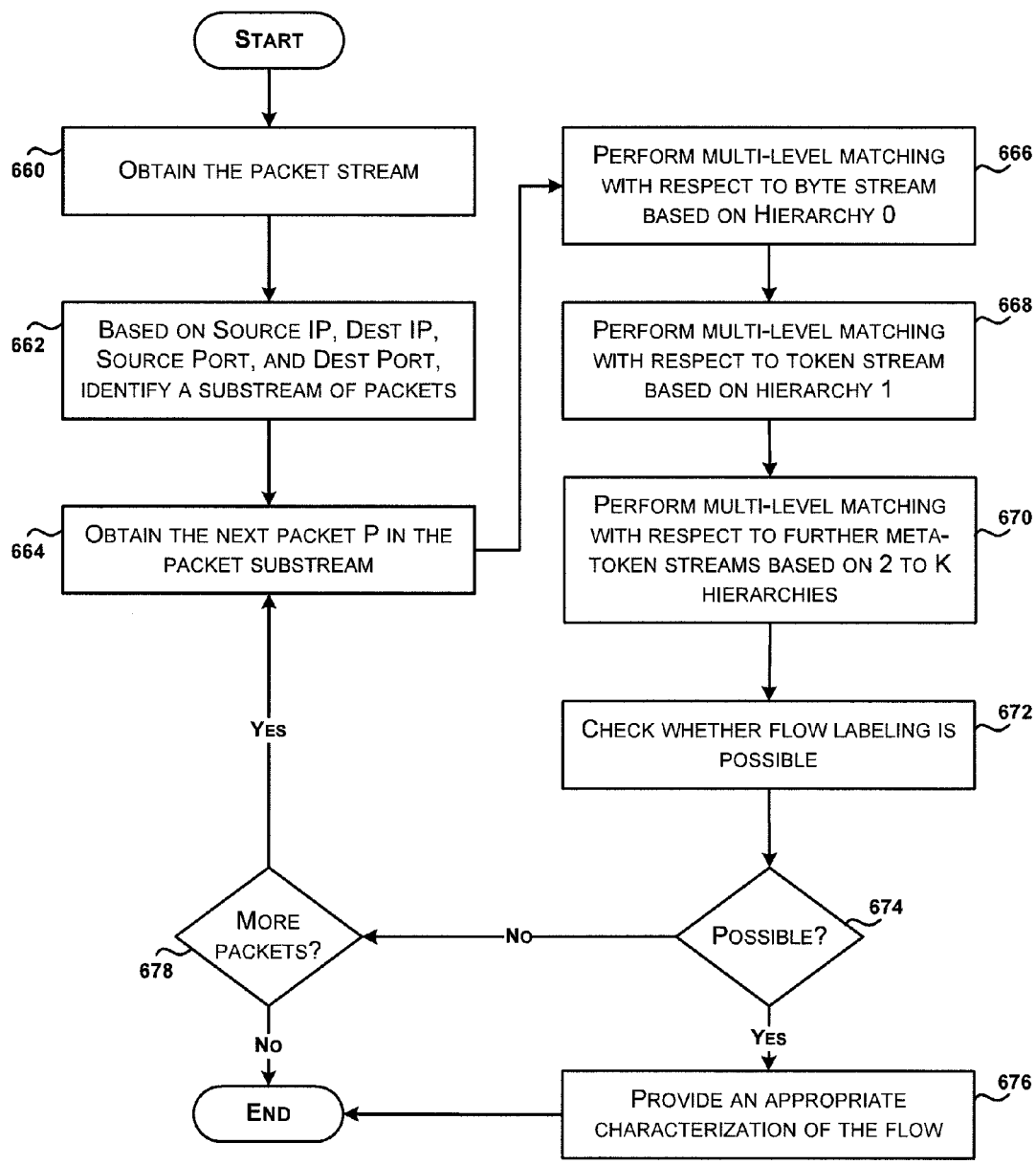
FIG. 6A: FLOW LABELING BASED ON MATCHED FSM

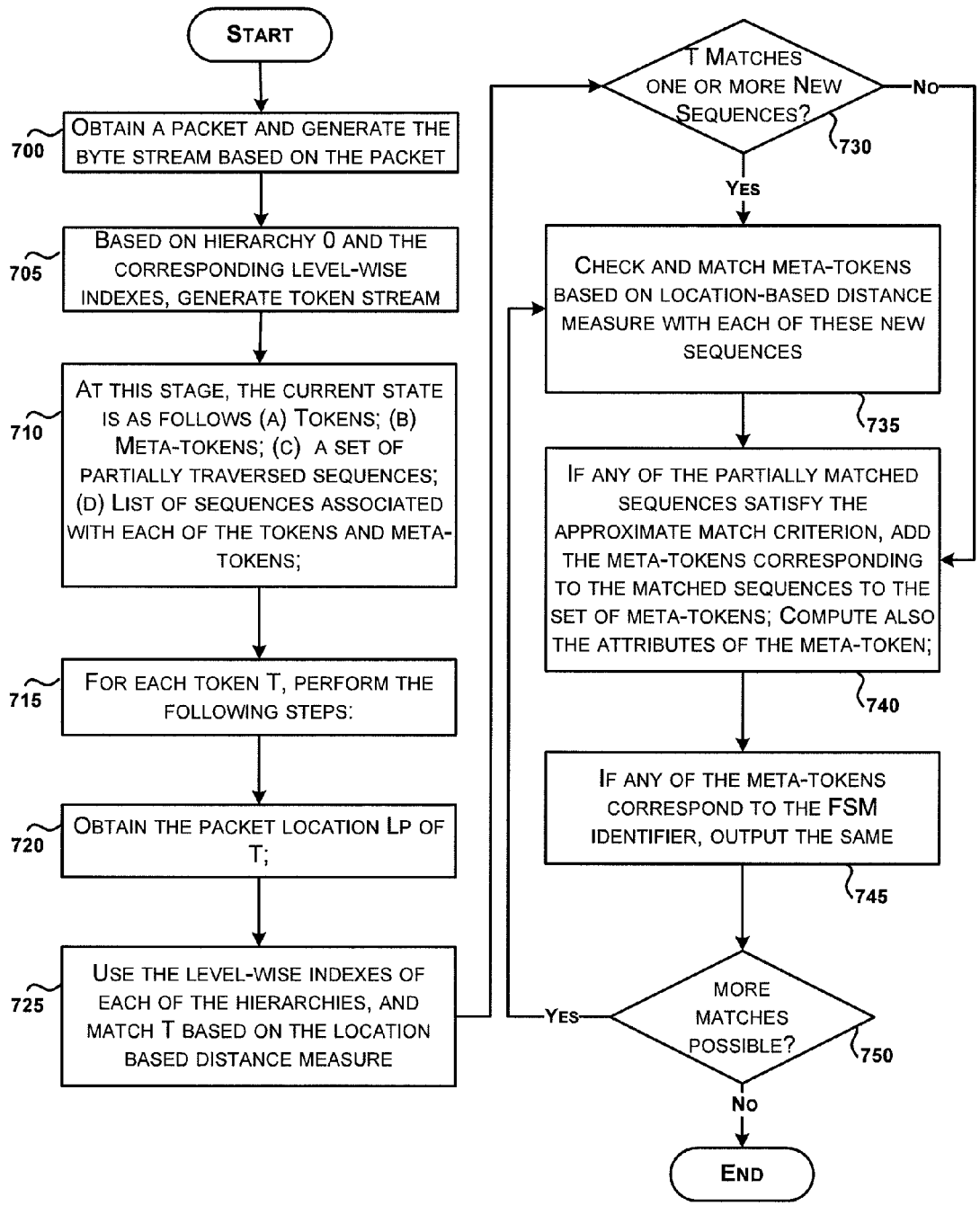
FIG. 7: MATCHING BASED ON MULTI-LEVEL INDEXES OF MULTIPLE HIERARCHIES

COMPUTING THE ATTRIBUTES OF A META-TOKEN:

LET T1, T2, ..., BE THE TOKENS INVOLVED IN DERIVING A META-TOKEN MT;
  LET THE LOCATION ATTRIBUTE OF T1 BE <X1, Y1>, T2 BE <X2, Y2>, ...;
    THIS LOCATION ATTRIBUTE IS CALLED AS TEMPLATE-BASED LOCATION ATTRIBUTE;
  DEFINE THE LOCATION ATTRIBUTE OF MT AS THE SET OF THE LOCATION ATTRIBUTES OF THE
    INVOLVED TOKENS = {<X1, Y1>, <X2, Y2>, ...};
  LET THE PRIORITY ATTRIBUTE OF T1 BE P1, T2 BE P2, ...
  DEFINE THE PRIORITY ATTRIBUTE OF MT AS THE MEAN OF P1, P2, ...;
  LET THE MANDATORY-OPTIONAL ATTRIBUTE OF T1 BE Q1, T2 BE Q2, ...
  NOTE THAT QI IS A BINARY VALUE WITH 0 MEANING OPTIONAL AND 1 MEANING MANDATORY;
  LET C1 BE THE NUMBER OF QI'S EACH WITH THE VALUE OF 1;
  LET C0 BE THE NUMBER OF QJ'S EACH WITH THE VALUE OF 0;
  THE MANDATORY-OPTIONAL ATTRIBUTE OF MT IS 1 IF C1 > C0 ELSE 0;

COMPUTATION OF LOCATION BASED ORDERING:

LOCATION BASED ORDERING DEFINES AN ORDERING IN GENERAL OF ANY TWO META-TOKENS;
  LOCATION BASED ORDERING (MT1, MT2):
    TEMPLATE LOCATION OF MT1= {<X11, Y11>, <X12, Y12>, ...};
    TEMPLATE LOCATION OF MT2 = {<X21, Y21>, <X22, Y22>, ...};
    PACKET LOCATION OF MT1= {<A11, B11>, <A12, B12>, ...};
    PACKET LOCATION OF MT2 = {<A21, B21>, <A22, B22>, ...};
    TAKE ANY PAIR P1: <X1I, Y1I> AND <X2J, Y2J> AND THE CORRESPONDING PAIR
            P2: <A1I, B1I> AND <A2J, B2J>;
    THE ORDER OF P1 AND P2 ARE SAME

COMPUTATION OF LOCATION BASED DISTANCE MEASURE:

LOCATION BASED DISTANCE MEASURE DEFINES DISTANCE MEASURE BETWEEN (A) A TOKEN AND
    A TOKEN, (B) A TOKEN AND A META-TOKEN, OR (C) A META-TOKEN AND A META-TOKEN;

LOCATION IS DEFINED AS A PAIR <X,Y> AT TOKEN-LEVEL;
  AT META-TOKEN LEVEL, IT IS DEFINED AS A SET OF PAIRS: {<X1,Y1>,<X2,Y2> ...>;

LOCATION BASED DISTANCE (T1, T2)
    LOCATION OF T1= {<X11, Y11>, <X12, Y12>, ...}
    LOCATION OF T2 = {<X21,Y21>, <X22, Y22>,...}
    COMPUTE PAIR-WISE DISTANCES, SAY, BASED ON EUCLIDEAN MEASURE;
      $D_{11}$ = $DIST_E$ (<X11, Y11>, <X21, Y21>}
      $D_{12}$ = $DIST_E$ (<X11, Y11>, <X22, Y22>)
      ...
      $D_{IJ}$ = $DIST_E$(<X1I, Y1I>, <X2J, Y2J>}
      ...
    DEFINE $DIST_L$ AS MINIMUM ($D_{11}$, $D_{12}$, ..., $D_{IJ}$, ...);

FIG. 7A: AN APPROACH FOR LOCATION BASED DISTANCE MEASURE

MATCHING BASED ON LOCATION BASED DISTANCE MEASURE

EACH TOKEN / META-TOKEN IN A SEQUENCE IS ASSOCIATED WITH A SET OF ATTRIBUTES; NOTE THAT THE TEMPLATE-BASED LOCATION ATTRIBUTE OF A TOKEN IS <X, Y> WHILE THE TEMPLATE-BASED LOCATION ATTRIBUTE OF A META-TOKEN IS {<X1, Y1>, <X2, Y2>, ...}
SIMILARLY, EACH TOKEN OBTAINED FROM A PACKET IS ASSOCIATED WITH A LOCATION ATTRIBUTE <A, B>; THIS LOCATION ATTRIBUTE IS CALLED AS PACKET-BASED LOCATION ATTRIBUTE;
MATCHED PORTIONS OF A SEQUENCE TO HAVE A PAIR OF LOCATION ATTRIBUTES (TEMPLATE-BASED AND PACKET-BASED): {<X1,Y1>, <X2,Y2>, ...} AND {<A1,B1>, <A2,B2>, ...};

MATCHING WITHIN A SEQUENCE:
ON MATCHING OF A TOKEN $T_P$ FROM A PACKET P WITH A TOKEN $T_S$ FROM A SEQUENCE S:
CASE THIS IS THE FIRST MATCH WITHIN S:
   BIND THE PACKET-BASED LOCATION ATTRIBUTE <A,B> OF $T_P$ WITH $T_S$ OF S;
CASE THIS IS THE SECOND MATCH WITHIN S:
   OBTAIN THE TEMPLATE-BASED LOCATION $L_{T1}$ OF THE FIRST MATCH;
   OBTAIN THE TEMPLATE-BASED LOCATION $L_{T2}$ OF THE SECOND MATCH;
   OBTAIN THE PACKET-BASED LOCATION $L_{P1}$ OF THE FIRST MATCH;
   OBTAIN THE TEMPLATE-BASED LOCATION $L_{P2}$ OF THE SECOND MATCH;
   CHECK TO ENSURE THAT ORDER OF $L_{P1}$ AND $L_{P2}$ IS THE SAME AS THAT OF $L_{T1}$ AND $L_{T2}$;
   COMPUTE $D_T$ AS THE DISTANCE BETWEEN $L_{T1}$ AND $L_{T2}$;
   COMPUTE $D_P$ AS THE DISTANCE BETWEEN $L_{P1}$ AND $L_{P2}$;
   COMPUTE SPF OF S AS $D_P/D_T$, WHERE SPF IS SEQUENCE PROPORTIONALITY FACTOR;
   BIND $L_{P2}$ WITH $T_S$;
CASE S IS A PARTIALLY MATCHED SEQUENCE:
   OBTAIN A MATCHED TOKEN $T_{S1}$ THAT IS NEAREST TO $T_S$ BASED ON THE LOCATION ATTRIBUTE $L_{T1}$ OF $T_S$ AND THE LOCATION ATTRIBUTE $L_{T2}$ OF $T_{S1}$ (TEMPLATE-BASED);
   DETERMINE THE DISTANCE $D_T$ BASED ON $L_{T1}$ AND $L_{T2}$;
   OBTAIN THE LOCATION $L_{P1}$ OF $T_P$ AND $L_{P2}$ THAT IS BOUND WITH $T_{S1}$ (PACKET-BASED);
   DETERMINE THE DISTANCE $D_P$ BASED ON $L_{P1}$ AND $L_{P2}$;
   CHECK IF $|SPF - (D_P/D_T)|$ IS LESS THAN A PRE-DEFINED THRESHOLD;
   IF SO, $T_P$ MATCHES WITH $T_S$ AND BIND $L_{P1}$ WITH $T_S$; UPDATE SPF;

APPROXIMATE MATCHING OF A SEQUENCE:

CONSIDER A SEQUENCE S;
   LET $T_1, T_2, ...$ BE THE TOKENS/ META-TOKENS INVOLVED IN S;
   LET $P_1, P_2, ...$ BE THE PRIORITIES ASSOCIATED WITH THE TOKENS/META-TOKENS;
   COMPUTE $P_S$ AS THE SUM OF $P_1, P_2, ...$;

DURING MATCHING:
   LET $M_1, M_2, ...$ BE THE TOKENS/META-TOKENS THAT MATCH THE TOKENS/META-TOKENS OF S;
   COMPUTE $P_M$ AS THE SUM OF $P_{I1}, P_{I2}, ...$ ASSOCIATED WITH $M_1, M_2, ...$;
   DECLARE S IS APPROXIMATELY MATCHED IF $|P_S - P_M|$ IS WITHIN A PRE-DEFINED THRESHOLD;

FIG. 7B: AN APPROACH FOR APPROXIMATE MATCHING

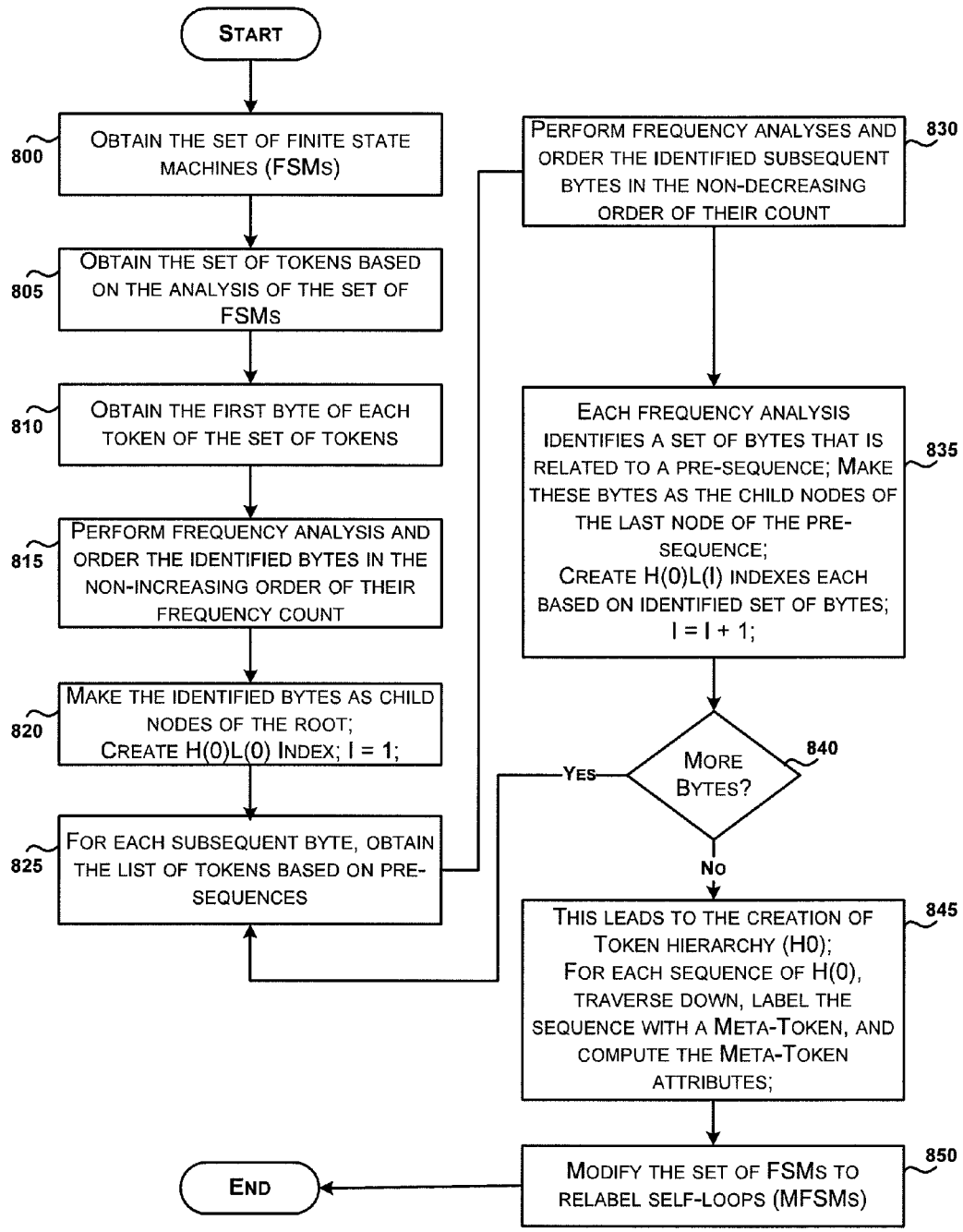
FIG. 8: CONSTRUCTION OF SEQUENCE MACHINES

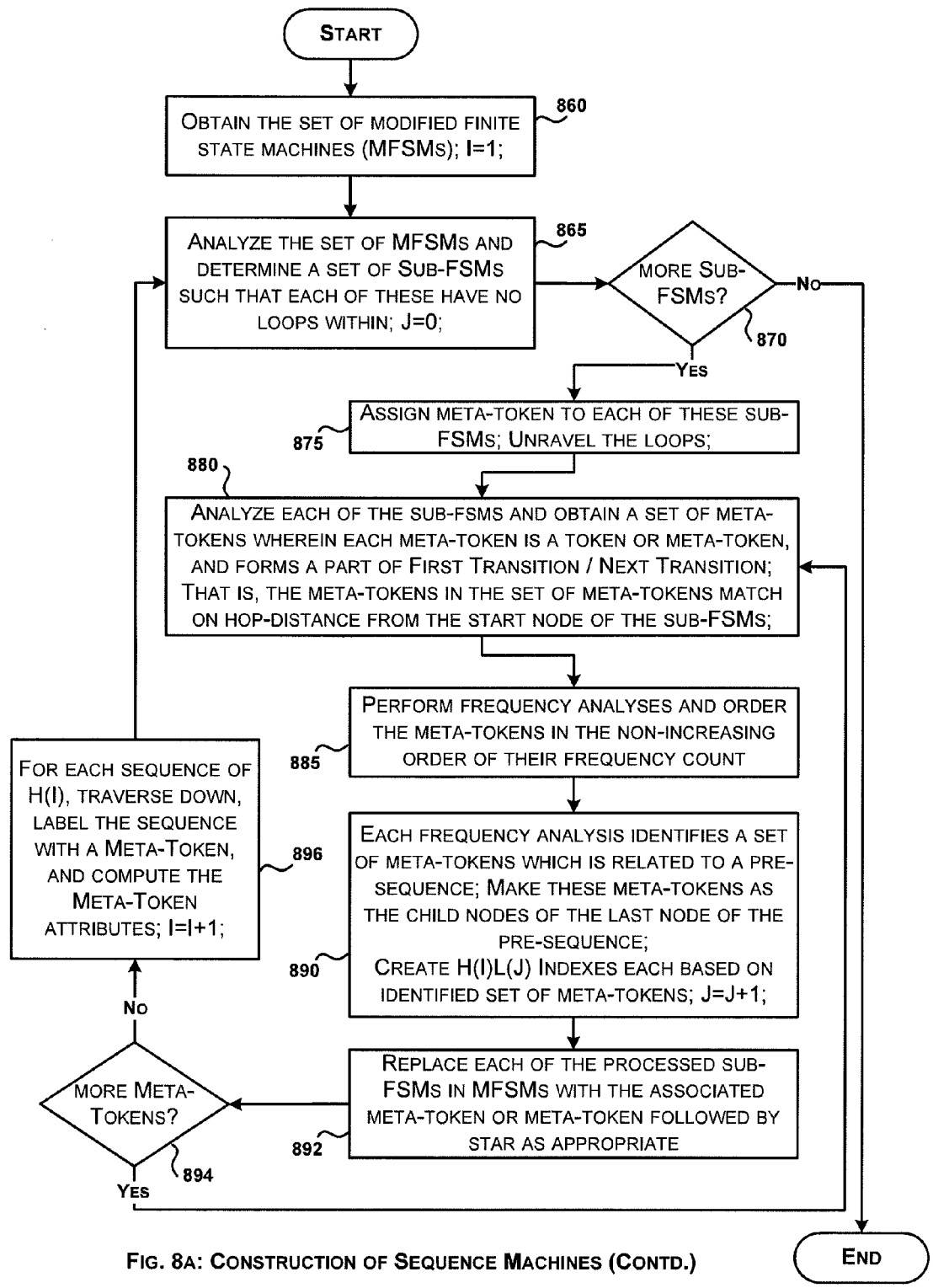
FIG. 8A: CONSTRUCTION OF SEQUENCE MACHINES (CONTD.)

SYSTEM AND METHOD FOR DEEP PACKET INSPECTION

FIELD OF THE INVENTION

The present invention relates to traffic analysis in general, more particularly, analysis of IP packets. Still more particularly, the present invention is related to a system and method for deep packet inspection at layer 3.

BACKGROUND OF THE INVENTION

Traffic analysis involves processing of network traffic at various network elements in a network and IP network traffic analysis is based on the analysis of IP packets. An IP packet consists of a header and a payload: header further comprising of source and destination IP addresses, and source and destination port numbers; payload comprises of application data. Typical IP traffic analysis is performed at two levels: layer 3 level and layer 7 level. Layer 7 level of traffic analysis is at application layer level leading to the availability of application specific information for deeper analysis. Specifically, at this level, the IP packets are used to construct application content allowing for the detailed analysis. On the other hand, the layer 3 analysis is based on the analysis of only packets without the knowledge of the applications involved and this provides limited opportunities for deep packet analysis.

There are multiple reasons why it is practically required to undertake deep packet analysis at layer 3: Consider an enterprise scenario; within the enterprise network, there is a need for undertaking fine grained bandwidth management and admission control. This is achieved by deep packet inspection. Further, such a deep packet inspection at layer 3 could be a front-end for an intrusion detection system at layer 7. And, finally, the deep packet analysis at layer 3 gives an opportunity for processing at wire speeds.

DESCRIPTION OF RELATED ART

U.S. Pat. No. 5,787,253 to McCreery; Timothy David (Lafayette, Calif.), Zabetian; Mahboud (Walnut Creek, Calif.) for "Apparatus and method of analyzing internet activity" (issued on Jul. 28, 1998 and assigned to The AG Group (Walnut Creek, Calif.)) describes an apparatus for analyzing Internet activity. The packet data is decoded at the internet protocol layer to provide information such as timing and sequencing data regarding the exchange of packets between nodes and the packet data for exchanges between multiple nodes may be recompiled into concatenated raw transaction data which may be coherently stored in a raw transaction data buffer. An application level protocol translator translates the raw transaction data and stores the data in a translated transaction data buffer. The translated data provides high level information regarding the transactions between nodes which is used to monitor or compile statistics regarding network or internetwork activity.

U.S. Pat. No. 6,591,299 to Riddle; Guy (Los Gatos, Calif.), Packer; Robert L. (Rancho Santa Fe, Calif.), Hill; Mark (Los Altos, Calif.) for "Method for automatically classifying traffic with enhanced hierarchy in a packet communications network" (issued on U.S. Pat. No. 6,591,299 and assigned to Packeteer, Inc. (Cupertino, Calif.)) describes a a method for automatically classifying packet flows for use in allocating bandwidth resources and the like by a rule of assignment of a service level in a packet communication network. The method comprises applying individual instances of traffic classification paradigms to packet network flows based on selectable information obtained from a plurality of layers to define a characteristic class, then mapping the flow to the defined traffic class.

U.S. Pat. No. 6,789,116 to Sarkissian; Haig A. (San Antonio, Tex.), Dietz; Russell S. (San Jose, Calif.), Koppenhaver; Andrew A. (Littleton, Colo.) for "State processor for pattern matching in a network monitor device" (issued on Sep. 7, 2004 and assigned to Sarkissian; Haig A. (San Antonio, Tex.), Dietz; Russell S. (San Jose, Calif.), Koppenhaver; Andrew A. (Littleton, Colo.)) describes a processor for processing contents of packets passing through a connection point on a computer network. The processor includes a searching apparatus having one or more comparators for searching for a reference string in the contents of a packet, and processes contents of all packets passing through the connection point in real time.

U.S. Pat. No. 7,017,186 to Day; Christopher W. (Biscayne Park, Fla.) for "Intrusion detection system using self-organizing clusters" (issued on Mar. 21, 2006 and assigned to Steelcloud, Inc. (Herndon, Va.)) describes a system that includes a vector builder that can be configured to generate multi-dimensional vectors from selected features of the pre-defined packet fields and to use a produced a self-organized map of clusters to detect anomalous correlations.

U.S. Pat. No. 7,143,442 to Scarfe; Richard T (Felixstowe, GB), Kirkham; Edmund A. (Ipswich, GB) for "System and method of detecting events" (issued on Nov. 28, 2006 and assigned to British Telecommunications (London, GB)) describes a system and method of detecting events, and is suitable particularly for detecting uncommon behaviour of network devices by firewall systems.

U.S. Pat. Application No. 20060212942 dated Sep. 21, 2006 and titled "Semantically-aware network intrusion signature generator" by Barford; Paul Robert; (Madison, Wis.); Giffin; Jonathon Thomas; (Madison, Wis.); Jha; Somesh; (Madison, Wis.); Yegneswaran; Vinod Trivandrum; (Foster City, Calif.) describes an automatic technique for generating signatures for malicious network traffic by performing a cluster analysis of known malicious traffic to create a signature in the form of a state machine.

U.S. Pat. Application No. 20060239219 dated Oct. 26, 2006 and titled "Application signature based traffic classification" by Haffner; Patrick Guy; (Atlantic Highlands, N.J.) Sen; Subhabrata; (New Providence, N.J.); Spatscheck; Oliver; (Randolph, N.J.); Wang; Dongmei; (Kearny, N.J.) describes a method for identifying traffic to an application including the steps of monitoring communication traffic in a network, identifying data from communication traffic content, and constructing a model for mapping the communication traffic for an application derived from data identified from the communication traffic content.

"A Finite-State-Machine based string matching system for Intrusion Detection on High-Speed Networks" by Tripp, G. (appeared in the Proceedings of the 14 th EICAR annual conference Saint Julians, Malta, 30 April-3 May 2005) describes a finite state machine approach for string matching within high-speed network intrusion detection systems.

"Applications of Finite State Machines General Decomposition Method with Optimization" by Pruteanu, C., Galea, D., and Haba, C. (appeared in the Proceedings of 8th International Conference on Development and Application Systems, Suceava, Romania, May 25-27, 2006) describes the General Decomposition Method of finite state machines (FSMs) based approach to divide a single FSM into a network of interacting FSMs by reducing each submachine's complexity while attempting to minimize the number of the obtained submachines.

The known systems do not address the various issues related to the deep packet inspection at layer 3 that accounts for application level semantics in the packet analysis. The present invention provides an effective system and method to perform deep packet inspection with the application level semantics described in the form finite state machines at wire speeds.

SUMMARY OF THE INVENTION

The primary objective of the invention is to perform deep packet inspection at layer 3 based on incoming network packets to semantically characterize the packet flows.

One aspect of the invention is to enable the describing of semantics in the form of a set of finite state machines.

Another aspect of the invention is to account for a set of key semantic concepts, temporal ordering among the set of key semantic concepts, spatial relationship among the set of key concepts, priorities of the key concepts of the set of key concepts, and mandatory/optional key-concepts.

Yet another aspect of the invention is to perform the out of order traversal of the set of finite state machines.

Another aspect of the invention is to automatically convert the set of finite state machines into a set of hierarchical sequence machines.

Yet another aspect of the invention is to multi-level indexing of the hierarchical sequence machines.

Another aspect of the invention is to match a packet stream based on multiple hierarchies.

Yet another aspect of the invention is to support approximate matching when complete information is not available.

Another aspect of the invention is to label an incoming network flow based on the best matched finite state machine.

BRIEF DESCRIPTION OF THE DRAWINGS

FIG. 1 depicts an overview of Network Architecture of Deep Packet Inspect at Layer 3 (DPIL3) System.

FIG. 1a depicts another Illustrative Network Architecture of DPIL3 System.

FIG. 2 provides an overview of System Architecture of DPIL3 System.

FIG. 3 depicts an Illustrative Domain-Specific Template.

FIG. 3a depicts an Illustrative Finite State Machine (FSM).

FIG. 4 depicts an illustrative Packet Stream Analysis.

FIG. 5 depicts an illustrative Multi-Level Indexing.

FIG. 6 provides an approach for matching based on Multiple Hierarchies.

FIG. 6a provides an approach for Flow Labeling based on Matched FSM.

FIG. 7 provides an approach for matching based on Multi-Level Indexes of Multiple Hierarchies.

FIG. 7a provides an approach for Location based Distance Measure.

FIG. 7b provides an approach for Approximate Matching.

FIG. 8 provides an approach for Construction of Sequence Machines.

FIG. 8a provides additional steps in the Construction of Sequence Machines.

DETAILED DESCRIPTION OF THE PREFERRED EMBODIMENTS

Network traffic analysis is performed for a variety of reasons: intrusion detection, viruses and malicious content detection, to address compliance and regulatory requirements, admission control and resource (say, bandwidth) allocation, traffic filtering, and traffic grooming. Some of these requirements demand real-time, wire speed processing while the offline processing is adequate for the other requirements. The more detailed is the processing, the more difficult it is to achieve wire speed processing: in such cases, typically, it pushed to offline processing (even though the real time processing is more beneficial). The tradeoff is between the depth of processing and closeness to wire speed processing. Hence, the challenge is to reach good depth at wire line speeds. One of the ways to achieve this is to process packets at layer 3: This gives an opportunity to process the network traffic as soon as possible. However, packet processing at layer 3 poses its own challenges such as out of order arrival and lack of explicit flow information.

FIG. 1 depicts an overview of Network Architecture of Deep Packet Inspect at Layer 3 (DPIL3) System. In this enterprise scenario, multiple local area networks that are IP networks (100, 110) are connected to an enterprise-wide IP network (120) through a network element (130). The requirement, here, is to perform traffic analysis at the traffic aggregation points in the network and the DPIL3 system (140) is positioned well to receive all of the traffic through the network element. As depicted, in one of the embodiments, the DPIL3 system is part of the network element and controls the traffic flow as appropriate. In another embodiment, the DPIL3 system performs traffic monitoring functionality and labels flows in real time for other applications to use this information as appropriate.

FIG. 1a depicts another illustrative Network Architecture of DPIL3 System. In this ISP scenario, multiple access networks (150, 160) are connected to the external IP network (170) through a network element (180). The DPIL3 system (190) is part of the network element to monitor and/or control network traffic as appropriate.

FIG. 2 provides an overview of System Architecture of DPIL3 System. The network traffic is obtained in the form of IP packets (200) and are segregated based on the implicit flow id associated with the packets (205). Note that the DPIL3 system (210) processes individual packets as they arrive and does not require the packets related to a session to be pooled up before processing. An incoming packet is processed based on a set of Finite State Machines (FSMs) (215). These validated FSMs are processed by Sequence Machine Construction subsystem (220) to generate a set of sequence machines (225). The incoming packet is analyzed using a set of multi-level sequence machines by performing appropriate traversals (230) and accounting for the out of order arrival of packets (235). In order to be effective and be able to achieve depth of processing at wire speeds, a partial match analysis is performed (240). Based on the match results, an appropriate characterization of a flow is achieved (245). Traffic logs (250) contain the results of the deep packet processing at layer 3. In order to ensure the suitability of FSMs, the FSMs are validated using a stream of packets (255) based on application-specific analysis (260) and domain-specific analysis (265).

FIG. 3 depicts an illustrative Domain-Specific Template. The template is required to provide information about (a) key-concepts; (b) priorities associated with the key-concepts; (c) mandatory and optional key-concepts; (d) temporal ordering; and (e) spatial information. For example, the key-concept "Current Assets" is associated with the spatial information of (2,0), is of priority 0.8, and is a mandatory key-concept (1). Specifically, any key-concept is associated with the following attributes: (a) Location attribute that is represented as a pair: <X, Y>; (b) Priority attribute that is defined as a value between 0 and 1 with values close to 0 depicting lower priority and values close to 1 depicted higher priority.; and (c)

Mandatory-optional attribute this is a binary attribute with the value of 0 indicating that the key-concept is optional and the value of 1 indicating that the key-concept is mandatory.

FIG. 3a depicts an illustrative FSM. Note that the FSM captures all the information associated with each of the key-concepts.

FIG. 4 depicts an illustrative packet stream analysis. The packet stream analysis is performed at multiple stages: Byte stage analysis (400), based on a byte stream, helps in efficient identification of tokens leading to the generation of a token stream. A typical byte stage analysis uses a byte hierarchy as depicted in 405. Note that each path (410) through the byte hierarchy depicts a byte sequence leading to a token (Tj). The next stage in the packet stream analysis is token stage analysis (415). This analysis is based on a token stream and helps in the efficient identification of sub-FSM identifiers. A typical token-stage analysis uses a token hierarchy as depicted in 420. Note that each path (425) through the token hierarchy depicts a token sequence leading to a sub-FSM identifier (Sj). The sub-FSM identifiers are also alternatively called as meta-tokens. Observe that the tokens part of a token hierarchy are depicted using the notation Tij*, wherever appropriate, indicating zero or more occurrences of the token Tij. This powerful representation helps in depicting FSMs using multiple sequences (such as Byte sequences, Token sequences, one or more Sub-FSM sequences). The next stage in the analysis is a sub-FSM stage and there could be multiple further stages each of which is sub-FSM based and building on the previous analyses. The sub-FSM stage analysis (430) is based on a sub-FSM stream and uses a sub-FSM hierarchy as depicted in 435. Note that each path (440) through the sub-FSM hierarchy depicts a sub-FSM sequence leading to either FSM identifier (F0) or a sub-FSM identifier. Again, observe that the sub-FSM identifiers part of a sub-FSM hierarchy are depicted using the notation Sij*, wherever appropriate, indicating zero or more occurrences of the sub-FSM identifier Sij. This process is continued until all the token/sub-FSM identifiers are resolved leading to the FSM identifiers. Note FSM identifiers are also alternatively called as labels.

FIG. 5 depicts an illustrative Multi-Level Indexing. An indexing scheme is essential to process the incoming packets at wire speed. The overall objective of the processing is to analyze the packets with respect to a set of FSMs. In turn, these FSMs are converted into a set of hierarchically related sequences (Byte sequences, Token sequences, Sub-FSM (meta-token) sequences, Sub-FSM (meta-token) sequences, . . . ) for reducing the complexity involved in "out of order" traversal of the FSMs. Another opportunity to improve the performance further is to index each of these hierarchical sequences. Consider a hierarchical sequence depicted in 500. Root N0 has six child nodes (505) and these nodes are arranged in the order of their probability of occurrence leading to efficient sequence matching: the indexing of these child nodes is depicted by Root Index I1(510) (H(I)L(0)—Indexes of Ith hierarchy at level 0). The hierarchical sequences are indexed level by level, and at each level, several indexes are maintained such as Index I10 and Index I11. Another illustration of indexing is of the nodes at level 3 (515) (H(I)L(3)) is depicted in 520.

FIG. 6 provides a detailed overview of packet analysis based on Multiple Hierarchies. Initially, the packet is input to byte stream analysis (600) and the bytes obtained from the packet are matched with the bytes that are part of the hierarchically related byte sequences using the level-wise indexes (605). Note that the matching performed here is one of exact matching (610). The resulting token stream is input to token stream analysis (615). This analysis is based on the level-wise indexed hierarchically related token sequences (620). In order to account for out of order arrivals and to achieve effective matching, a partial matching is performed (625). The output of the partial match analysis is a stream of sub-FSM identifiers, also called as meta-tokens. The next stage in the packet analysis is meta-token stream analysis (630) and is based on two inputs: token stream and meta-token stream. This analysis makes use of a level-wise indexed meta-token hierarchy (hierarchically related sub-FSM identifiers) (635) and a partial match is performed to achieve effective matching (640). The meta-token stream analysis is performed in several stages to finally resolve all meta-tokens to identify matched FSMs. Note that the further stages of meta-token analyses take as input the token stream and the meta-token streams that are generated by the earlier stages of meta-token analyses (645). Each further stage takes an appropriate level-wise indexed hierarchy K (650) and performs an appropriate partial match analysis (655). Observe that any of the token analysis or meta-token analyses stages can potentially lead to the identification of FSMs.

FIG. 6a provides an approach for Flow Labeling based on the Matched FSM. The processing is based on a stream of packets (660). The packets are grouped according to the implicit session information, say, taking into account source and destination IP addresses, and source and destination port numbers (662). The packets belonging to a session are processed together. Obtain a packet P of the packet substream of a session (664). Perform multi-level matching with respect to the byte stream associated with P using the Hierarchy 0 (666). This generates a token stream and is used to perform multi-level matching using the Hierarchy 1 (668). Continuing the processing, perform multi-level matching with respect to further meta-token streams using Hierarchies 2 to K (670). Gather the matched sequences and check whether flow labeling is possible (672). If so (674), provide an appropriate characterization of the flow related to the session (676). Otherwise, continue to process the further available packets (678). Note that as the FSM labels are based on domain and applications, the flow labels provide information about the nature of the flow supporting high level decisions based on policies.

FIG. 7 provides an approach for matching based on Multi-Level indexes of Multiple Hierarchies. Obtain a packet and generate the byte stream based on the packet (700). Based on hierarchy 0 and the corresponding level-wise indexes, generate token stream (705). At this stage, the current state is as follows (a) set of Tokens (ST); (b) a set of Meta-tokens (SMT); (c) a Set of Partially traversed sequences (SPS); and (d) List of sequences associated with each of the tokens and meta-tokens (710). Here, ST depicts the tokens that are being explored to match the sequences associated with the hierarchies. In order to account for out of order arrival of packets and the distributed nature of content across multiple packets, each token is matched against at as many places within as many sequences of as many hierarchies. The tokens of a packet would remain in ST until a successful sequence matching is achieved: here, the matching is either exact or approximate. Basically, approximate matching is preferred as FSMs are generic representations. Once a match is achieved, all the tokens that are used in matching with the sequences are removed from ST. Multiple hierarchies also account for multiple sub-FSMs and each of the hierarchies lead to the identification of sub-FSM labels or, alternatively, called meta-tokens. SMT depicts a set of meta-tokens that have been successfully matched until now. These meta-tokens are used during further sequence matching to finally lead to the matched FSMs. SPS depicts the set of partially traversed sequences and as more tokens arrive and more meta-tokens get identified, an attempt is made to match these sequences to successfully match as many of them. In order to efficiently traverse multiple sequences, each token is associated with a list of partially matched sequences so that on completion of a matching of a sequence, it is easy to undo other matches that were also explored to account for out of order arrival of packets and possible incomplete information. Note that each matched token within a partially matched sequence has two location attributes: one based on what is associated with FSMs called as template location; and the second based on the location of the token within a packet called as packet location.

For each token T, perform the following steps (715). Obtain the packet location Lp of T (720). Use the level-wise indexes of each of the hierarchies, and match T based on the location based distance measure (725). If T matches with one or more new sequences (730), Check and match meta-tokens based on location-based distance measure with each of these new sequences (735). If any of the partially matched sequences satisfy the approximate match criterion, add the meta-tokens corresponding to the matched sequences to the set of meta-tokens; compute also the attributes of the meta-token (740). If any of the meta-tokens correspond to the FSM identifier, output the same (745). If more matches are possible (750), proceed to Step 735.

FIG. 7a describes an approach for location based distance measure. Computing the attributes of a meta-token:
Let T1, T2, . . . , be the tokens involved in deriving a meta-token MT;
Let the location attribute of T1 be $<X1, Y1>$, T2 be $<X2, Y2>$, . . . ; This location attribute is called as template-based location attribute;
Define the location attribute of MT as the set of the location attributes of the involved tokens=$\{<X1, Y1>, <X2, Y2> ...\}$;
Let the priority attribute of T1 be P1, T2 be P2, . . .
Define the priority attribute of MT as the mean of P1, P2, . . . ;
Let the mandatory-optional attribute of T1 be Q1, T2 be Q2, . . .
Note that Qi is a binary value with 0 meaning optional and 1 meaning mandatory;
Let C1 be the number of Qi's each with the value of 1;
Let C0 be the number of Qj's each with the value of 0;
The mandatory-optional attribute of MT is 1 if C1>C0 else 0;
Computation of location based ordering:
Location based ordering defines an ordering in general of any two meta-tokens;
Location based ordering (MT1, MT2):
    Template location of MT1=$\{<X11, Y11>, <X12, Y12>, ...\}$;
    Template location of MT2=$\{<X21, Y21>, <X22, Y22>, ...\}$;
    Packet location of MT1=$\{<A11, B11>, <A12, B12>, ...\}$;
    Packet location of MT2=$\{<A21, B21>, <A22, B22>, ...\}$;
    Take any pair P1: $<X1i, Y1i>$ and $<X2j, Y2j>$ and the corresponding pair
    P2: $<A1i, B1i>$ and $<A2j, B2j>$;
    the order of P1 and P2 are same
Computation of Location based Distance Measure:
Location based distance measure defines distance measure between (a) a token and a token, (b) a token and a meta-token, or (c) a meta-token and a meta-token;
Location is defined as a pair $<X,Y>$ at token-level;

At meta-token level, it is defined as a set of pairs: $\{<X1, Y1>, <X2,Y2> ... >$;
Location based Distance (T1, T2)
    Location of T1=$\{<X11, Y11>, <X12, Y12>, ...\}$
    Location of T2=$\{<X21, Y21>, <X22, Y22>, ...\}$
    Compute pair-wise distances, say, based on Euclidean measure;
        D11=DISTe ($<X11, Y11>, <X21, Y21>$)
        D12=DISTe ($<X11, Y11>, <X22, Y22>$)
        Dij=DISTe($<X1i, Y1i>, <X2j, Y2j>$)
Define DIST1 as Minimum (D11, D12, . . . , Dij, . . . );
FIG. 7b provides an approach approximate matching.
Matching based on Location based Distance Measure
Each token/meta-token in a sequence is associated with a set of attributes; Note that the template-based location attribute of a token is $<X, Y>$ while the template-based location attribute of a meta-token is $\{<X1, Y1>, <X2, Y2>, ...\}$
Similarly, each token obtained from a packet is associated with a location attribute $<A, B>$; This location attribute is called as packet-based location attribute;
Matched portions of a sequence to have a pair of location attributes (template-based and packet-based): $\{<X1, Y1>, <X2, Y2>, ...\}$ and $\{<A1, B1>, <A2, B2>, ...\}$;
Matching within a sequence:
On matching of a token Tp from a packet P with a token Ts from a sequence S:
Case this is the first match within S:
    Bind the packet-based location attribute $<A,B>$ of Tp with Ts of S;
Case this is the second match within S:
    Obtain the template-based location Lt1 of the first match;
    Obtain the template-based location Lt2 of the second match;
    Obtain the packet-based location Lp1 of the first match;
    Obtain the template-based location Lp2 of the second match;
    Check to ensure that order of Lp1 and Lp2 is the same as that of Lt1 and Lt2;
    Compute Dt as the distance between Lt1 and Lt2;
    Compute Dp as the distance between Lp1 and Lp2;
    Compute SPF of S as Dp/Dt, where SPF is Sequence Proportionality Factor;
    Bind Lp2 with Ts;
Case S is a partially matched sequence:
    Obtain a matched token Ts1 that is nearest to Ts based on the location attribute Lt1 of Ts and the location attribute Lt2 of Ts1 (template-based);
    Determine the distance Dt based on Lt1 and Lt2;
    Obtain the location Lp1 of Tp and Lp2 that is bound with Ts1 (packet-based);
    Determine the distance Dp based on Lp1 and Lp2;
    Check if |SPF−(Dp/Dt)| is less than a pre-defined threshold;
    If so, Tp matches with Ts and bind Lp1 with Ts; Update SPF;
Approximate Matching of a sequence:
Consider a sequence S;
Let T1, T2, be the tokens/meta-tokens involved in S;
Let P1, P2, be the priorities associated with the tokens/meta-tokens;
Compute Ps as the sum of P1, P2, . . . ;

During matching:
Let M1, M2, ... be the tokens/meta-tokens that match the tokens/meta-tokens of S;
Compute Pm as the sum of Pi1, Pi2, ... associated with M1, M2, ...;
Declare S is approximately matched if |Ps−Pm| is within a pre-defined threshold;

FIG. 8 provides an approach for the Construction of Sequence Machines.

Obtain the set of finite state machines (FSMs) (800). Obtain the set of tokens based on the analysis of the set of FSMs (805). Obtain the first byte of each token of the set of tokens (810). Perform frequency analysis and order the identified bytes in the non-increasing order of their frequency count (815). Make the identified bytes as child nodes of the root; Create H(0)L(0) Index; and set I to 1 (820). For each subsequent byte, obtain the list of tokens based on pre-sequences (825). Perform frequency analyses and order the identified subsequent bytes in the non-decreasing order of their count (830). Each frequency analysis identifies a set of bytes that is related to a pre-sequence; Make these bytes as the child nodes of the last node of the pre-sequence; Create H(0)L(1) indexes each based on identified set of bytes; and set I to I+1 (835). If there are more bytes (840), go to Step 825. This leads to the creation of Token hierarchy (H0); For each sequence of H(0), traverse down, label the sequence with a Meta-Token, and compute the Meta-Token attributes (845). Note these meta-tokens are the internally generated distinct identifiers. Modify the set of FSMs to relabel self-loops (MFSMs) (850).

FIG. 8a provides additional steps in the Construction of Sequence Machines. Obtain the set of modified finite state machines (MFSMs) and set I to 1 (860). Analyze the set of MFSMs and determine a set of Sub-SFMs such that each of these have no loops (or alternatively called as cycles) within and set J to 0 (865). If there are more sub-FSMs to be processed (870), assign meta-token to each of these sub-FSMs and Unravel the loops (875). Analyze each of the sub-FSMs and obtain a set of meta-tokens wherein each meta-token is a token or meta-token, and forms a part of First Transition/Next Transition; That is, the meta-tokens in the set of meta-tokens match on hop-distance from the start node of the sub-FSMs (880). Hop distance defines the length of a sub-path from the start node of a sub-FSM to any node in the sub-FSM. Perform frequency analyses and order the meta-tokens in the non-increasing order of their frequency count (885). Each frequency analysis identifies a set of meta-tokens which is related to a pre-sequence; Make these meta-tokens as the child nodes of the last node of the pre-sequence; Create H(I)L(J) Indexes each based on identified set of meta-tokens; and set J=J+1 (890). Replace each of the processed sub-FSMs in MFSMs with the associated meta-token or meta-token followed by star as appropriate (892). If there are more meta-tokens (894), go to Step 880. For each sequence of H(I), traverse down, label the sequence with a Meta-Token, compute the Meta-Token attributes, and set I=I+1 (896).

Thus, a system and method for deep packet inspection at layer 3 is disclosed. Although the present invention has been described particularly with reference to the figures, it will be apparent to one of the ordinary skill in the art that the present invention may appear in any number of systems that supports deep packet processing. It is further contemplated that many changes and modifications may be made by one of ordinary skill in the art without departing from the spirit and scope of the present invention.

What is claimed is:

1. A system for deep packet inspection at layer 3 based on a plurality of packets associated with a plurality of sessions, a plurality of templates, a plurality of finite state machines, and a plurality of labels to result in a plurality of session labels associated with said plurality of sessions, said system comprising:

means for obtaining of said plurality of templates, wherein a template of said plurality of templates is based on a plurality of key-concepts and a key-concept of said plurality of key-concepts of said template is associated with a plurality of attributes comprising of a template location attribute, a priority attribute, and a mandatory-optional attribute;

means for determining of said plurality of finite state machines, wherein each of said plurality of finite state machines is based on a template of said plurality of templates, and each of said plurality of finite state machines is associated with a label of said plurality of labels;

means for constructing of a plurality of sequence machines along with a plurality of level-wise indexes based on said plurality of finite state machines, wherein each of said plurality of sequence machines is hierarchical in structure involving a plurality of sequences, a sequence of said plurality of sequences is labeled using a meta-token, wherein said meta-token is an internally generated distinct identifier, and said sequence comprises of a plurality of nodes, wherein each node of said plurality of nodes is labeled using a key-concept of said plurality of key-concepts, said key-concept followed by star, a meta-token, wherein said meta-token is an internally generated distinct identifier, or said meta-token followed by star;

means for determining of a plurality of session packets based on said plurality of packets, wherein said plurality of session packets is associated with a session of said plurality of sessions and each of said plurality of session packets is a packet of said plurality of packets;

means for performing of byte stream analysis of said session packets resulting in a token stream based on a level-wise indexed hierarchy 0 of said plurality of said plurality of level-wise indexes;

means for performing of token stream analysis of said token stream resulting in a meta-token stream, a plurality of partially matched sequences, and a plurality of identified finite state machines based on a level-wise indexed hierarchy 1 of said plurality of level-wise indexes;

means for performing of meta-token-stream analysis of said meta-token stream resulting in the updation of said meta-token stream, said plurality of partially matched sequences, and said plurality of identified finite state machines based on a level-wise indexed hierarchy 2 of said plurality of said plurality of level-wise indexes;

means for performing of approximate matching of said plurality of partially matched sequences resulting in the updation of said identified finite state machines;

means for determining of a plurality of assigned labels based on a plurality of finite state machine labels of said plurality of labels associated with said plurality of identified finite state machines; and means for making of said plurality of assigned labels a part of said plurality of session labels.

2. The system of claim 1, wherein said means for determining of said plurality of finite state machines further comprising:

means for determining of a template of said plurality of templates;

mean for determining of a plurality of states associated with a finite state machine of said plurality of finite state machines;

means for determining of a plurality of transitions associated with said finite state machine based on said template;

means for associating of a key-concept of said template to a transition of said plurality of transitions;

means for determining of a template location of said key-concept, wherein said template location is a pair of values, based on a template location attribute of a plurality of attributes of said key-concept with respect to said template;

means for associating of said template location with said transition;

means for determining of a priority of said key-concept based on a priority attribute of a plurality of attributes of said key-concept;

means for associating of said priority with said transition;

means for determining of a mandatory-optional factor of said key-concept based on a mandatory-optional attribute of a plurality of attributes of said key-concept; and means for associating of said mandatory-optional factor with said transition, and wherein a value of 0 associated with said mandatory-optional factor indicates that said transition is optional and a value of 1 associated with said mandatory-optional factor indicates that said transition is mandatory.

3. The system of claim 1, wherein said means for constructing further comprising:

means for determining of a plurality of tokens based on said plurality of finite state machines, wherein each token of said plurality of tokens is a key-concept associated with a transition of a finite state machine of said plurality of finite state machines;

means for determining of a plurality of ith bytes, wherein each of said plurality of ith bytes is based on the ith byte of each of said plurality of tokens;

means for computing of a plurality of frequency counts of said plurality of ith bytes, wherein each of said plurality of frequency counts is based on a pre-sequence until ith byte, and said pre-sequence is associated with a byte sequence of a sequence machine of said plurality of sequence machines;

means for ordering of said plurality of ith bytes into a plurality of plurality of ordered ith bytes based on said plurality of frequency counts;

means for making of a plurality of ordered ith bytes of said plurality of plurality of ordered ith bytes as a plurality of child nodes of a pre-sequence associated with a byte sequence of said sequence machine;

means for associating of a token of said plurality of tokens with said byte sequence; and means for creating of a plurality of level-wise indexed hierarchy 0 of said plurality of level-wise indexes based on said plurality of plurality of ordered ith bytes, wherein each of said plurality of level-wise indexed hierarchy 0 is associated with a pre-sequence associated with a byte sequence of said sequence machine.

4. The system of claim 3, wherein said means further comprising:

means for modifying of said plurality of finite state machines into a plurality of modified finite state machines, wherein said modifying involves identifying a self-loop within a finite state machine of said plurality of finite state machines and replacing said self-loop with a token followed by star.

5. The system of claim 4, wherein said means further comprising:

means for determining of a plurality of sub-finite state machines, wherein each of said plurality of sub-finite state machines is a part of a finite state machine of said plurality of modified finite state machines, and there are no loops within each of said plurality of sub-finite state machines;

means for associating of a meta-token with each of said plurality of sub-finite state machines;, wherein said meta-token is an internally generated distinct identifier;

means for determining of a plurality of level-wise tokens based on said plurality of sub-finite state machines, wherein each of said plurality of level-wise tokens is a token or a token followed by star, each of said plurality of level-wise tokens is a key-concept of said plurality of key-concepts, and the hop distance from a start state of a sub-finite state machine of said plurality of sub-finite state machines of each of said plurality of level-wise tokens is the same;

means for computing of a plurality of frequency counts of said plurality of level-wise tokens, wherein each of said plurality of frequency counts is based on a pre-sequence associated with a sequence of a sequence machine of said plurality of sequence machines until the current hop distance;

means for ordering of said plurality of level-wise tokens into a plurality of plurality of ordered level-wise tokens based on said plurality of frequency counts;

means for making of a plurality of ordered level-wise tokens of said plurality of plurality of ordered level-wise tokens as child nodes of a pre-sequence associated with a sequence of said sequence machine;

means for creating of a plurality of level-wise indexed hierarchy 1 of said plurality of level-wise indexes based on said plurality of plurality of ordered level-wise tokens, wherein each of said plurality of level-wise indexed hierarchy 1 is associated with a pre-sequence associated with a sequence of said sequence machine; and means for modifying of said plurality of modified finite state machines by replacing each of said plurality of sub-finite state machines with a meta-token associated with said sub-fine state machine of said plurality of sub-finite state machines or said meta-token followed by star.

6. The system of claim 3, wherein said means further comprising:

means for determining of a sequence machine of said plurality of sequence machines;

means for determining of a sequence of a plurality of sequences associated with said sequence machine;

means for determining of a meta-token associated as a label of said sequence; and means for computing of a plurality of attributes of said meta-token, wherein said computing further comprising:

means for determining of a plurality of meta-tokens associated with said sequence;

means for determining of a plurality of template location attributes of said plurality of meta-tokens;

means for computing of a template location attribute of a plurality of attributes of said meta-token based on the set union said plurality of template location attributes;

means for determining of a plurality of priority attributes of said plurality of meta-tokens;
means for computing of a priority attribute of said plurality of attributes of said meta-token based on the mean value of said plurality of priority attributes;
means for determining of a plurality of mandatory-optional attributes of said plurality of meta-tokens;
means for computing of a number of ones based on said plurality of mandatory-optional attributes;
means for computing of a number of zeros based on based on said plurality of mandatory-optional attributes; and
means for computing of a mandatory-optional attribute of said plurality of attributes of said meta-token based on said number of ones and said number of zeros.

7. The system of claim 1, wherein said means for performing byte stream analysis further comprising:
means for determining of a packet of said plurality of session packets;
means for determining of a byte sequence machine based on said level-wise indexed hierarchy 0 and said plurality of sequence machines;
means for determining of a plurality of byte sequences of said byte sequence machine;
means for determining of a plurality of bytes of said packet;
means for exact matching of a byte of said plurality of bytes with respect to a each of said plurality of byte sequences;
means for determining of a sequence of said byte sequences, wherein said sequence is completely matched based on said plurality of bytes;
means for determining of a token associated with said sequence; and
means for making of said token a part of said token stream.

8. The system of claim 1, wherein said means for performing of token stream analysis further comprising:
means for determining of a token of said token stream;
means for determining of a token sequence machine based on said level-wise indexed hierarchy 1 and said plurality of sequence machines;
means for determining of a plurality of token sequences of said token sequence machine;
means for location matching of a token with respect to each of said plurality of token sequences;
means for determining of a token sequence of said plurality of token sequences, wherein said token sequence is partially matched based on said token stream; and
means for determining of a meta-token associated with said token sequence;
means for making of said meta-token a part of said meta-token stream;
means for determining of a meta-token of said meta-token stream, wherein said meta-token matches with a label of a finite state machine of said plurality of finite state machines; and
means for making of said finite state machine a part of said plurality of identified finite state machines.

9. The system of claim 8, wherein said means for location matching further comprises of:
means for determining of a packet of said session packets, wherein said token is a part of said packet;
means for determining of a token sequence of plurality of token sequences;
means for determining of a sequence token of said token sequence, wherein said sequence token matches with said token;
means for determining of a template location of a plurality of attributes of said sequence token;
means for determining of a packet location of said token based on said packet; and
means for binding of said packet location with said sequence token.

10. The system of claim 9, wherein said means further comprising:
means for determining of a packet of said session packets, wherein said token is a part of said packet;
means for determining of a token sequence of plurality of token sequences;
means for determining of a sequence token 2 of said token sequence, wherein said sequence token 2 matches with said token;
means for determining of a template location 2 of a plurality of attributes of said sequence token;
means for determining of a packet location 2 of said token based on said packet;
means for determining of a sequence token 1 of said token sequence, wherein said sequence token 1 matches with a token 1 of said token stream;
means for determining of a template location 1 of a plurality of attributes of said sequence token 1;
means for determining of a packet location 1 of said token 1 based on said packet;
means for determining an order of said template location 1, said template location 2, said packet location 1, and said packet location 2, wherein said order is unity;
means for computing of a location based template distance based on said template location 1 and said template location 2;
means for computing of a location based packet distance based on said packet location 1 and said packet location 2;
means for computing of a sequence proportionality factor of said token sequence based on said location based location based template distance and said location based packet distance;
means for binding of said packet location 2 with said sequence token 2; and
means for binding of said sequence proportionality factor with said token sequence.

11. The system of claim 9, wherein said means further comprising:
means for determining of a packet of said session packets, wherein said token is a part of said packet;
means for determining of a token sequence of plurality of token sequences;
means for determining of a sequence token 2 of said token sequence, wherein said sequence token 2 matches with said token;
means for determining of a template location 2 of a plurality of attributes of said sequence token;
means for determining of a packet location 2 of said token based on said packet;
means for determining of a sequence token 1 of said token sequence, wherein said sequence token 1 matches with a token 1 of said token stream and said sequence token 1 is nearest to said sequence token 2 based on a template location 1 of said sequence token 1 and said template location 2;
means for determining of a packet location 1 of said token 1 based on said packet;
means for determining an order of said template location 1, said template location 2, said packet location 1, and said packet location 2, wherein said order is unity;

means for computing of a location based template distance based on said template location 1 and template location 2;

means for computing of a location based packet distance based on said packet location 1 and said packet location 2;

means for computing of a sequence proportionality factor 1 based on said location based template distance and said location based packet distance;

means for computing of a difference value based on said sequence proportionality factor 1 and a sequence proportionality factor of said token sequence, wherein said difference value is less than a pre-defined threshold;

means for updating of said sequence proportionality factor based on said sequence proportionality factor 1;

means for binding of said packet location 2 with said sequence token 2; and means for binding of said sequence proportionality factor with said token sequence.

12. The system of claim 10, wherein said means for determining said order further comprising:

means for determining of a plurality of template 1 locations based on said template location 1;

means for determining of a plurality of template 2 locations based on said template location 2;

means for determining of a plurality of packet 1 locations based on said packet location 1;

means for determining of a plurality of packet 2 locations based on said packet location 2;

means for obtaining a pair of template locations, wherein one template location of said pair of template locations is a part of said plurality of template 1 locations, and second template location of said pair of template locations is a part of said plurality of template 2 locations;

means for obtaining a pair of packet locations, wherein one packet location of said pair of packet locations is a part of said plurality of packet 1 locations and corresponds with said one template location, and second packet location of said pair of packet locations is a part of said plurality of packet 2 locations and corresponds with said second template location;

means for determining of an order 1, wherein said order 1 is unity if one template location precedes second template location and said order 1 is zero otherwise;

means for determining of an order 2, wherein said order 2 is unity if one packet location precedes second packet location and said order 2 is zero otherwise; and means for assigning unity to said order, wherein said order 1 is equal to said order 2.

13. The system of claim 10, wherein said means for computing location based template distance further comprising:

means for determining of said sequence token 2;

means for determining of said sequence token 1;

means for determining of a plurality of template 1 locations based on said sequence token 1;

means for determining of a plurality of template 2 locations based on said sequence token 2;

means for computing of a plurality of pair-wise distances based on said plurality of template 1 locations and said plurality of template 2 locations, wherein a pair-wise distance of said plurality of pair-wise distances is based on the distance between a location of said plurality of template 1 locations and a location of said plurality of template 2 locations;

means for computing of a minimum pair-wise distance based on said plurality of pair-wise distances; and means for assigning of said minimum pair-wise distance to said location based template distance.

14. The system of claim 10, wherein said means for computing location based packet distance further comprising:

means for determining of said packet;

means for determining of said token;

means for determining of said token 1;

means for determining of a plurality of packet 1 locations based on said token 1 and said packet;

means for determining of a plurality of packet 2 locations based on said token and said packet;

means for computing of a plurality of pair-wise distances based on said plurality of packet 1 locations and said plurality of packet 2 locations, wherein a pair-wise distance of said plurality of pair-wise distances is based on the distance between a location of said plurality of packet 1 locations and a location of said plurality of packet 2 locations;

means for computing of a minimum pair-wise distance based on said plurality of pair-wise distances; and means for assigning of said minimum pair-wise distance to said location based packet distance.

15. The system of claim 1, wherein said means for approximate matching further comprising:

means for determining of a sequence of said plurality of partially matched sequences;

means for determining of a plurality of sequence tokens associated with said sequence, wherein each of said plurality of sequence tokens is a token or a meta-token;

means for determining of a plurality of priorities associated with said plurality of sequence tokens, wherein each of said plurality of priorities is associated with a sequence token of said plurality of sequence tokens;

means for computing of a sequence priority based on said plurality of priorities;

means for determining of a plurality of matched tokens associated with said sequence, wherein each of said plurality of matched tokens is a token or a meta-token that is matched with respect to a packet of said plurality of session packets;

means for determining of a plurality of matched priorities associated with said plurality of matched tokens, wherein each of said plurality of matched priorities is associated with a matched token of said plurality of matched tokens;

means for computing of a matched priority based on said plurality of matched priorities;

means for computing of a match priority based on said sequence priority and said matched priority;

means for determining of a finite state machine associated said sequence, wherein said match priority is less than a pre-defined threshold;

means for making of said finite state machine a part of said plurality of identified finite state machines.

16. The system of claim 4, wherein said means further comprising:

means for unraveling of a plurality of self loops within said plurality of modified finite state machines, wherein said unraveling comprises of replacing a self loop of said plurality of self loops with a meta-token followed by star;

means for determining of a plurality of sub-finite state machines, wherein each of said plurality of sub-finite state machines is a part of said plurality of modified finite state machines, and there are no loops within each of said plurality of sub-finite state machines;

means for assigning of a meta-token to each of said plurality of sub-finite state machines, wherein said meta-token is an internally generated distinct identifier;

means for determining of a plurality of level-wise meta-tokens based on said sub-finite state machines, wherein each of said plurality of level-wise meta tokens is a token, a token followed by star, a meta-token, or a meta-token followed by star, and the hop distance from a start state of a sub-finite state machine of said plurality of sub-finite state machines of each of said plurality of level-wise meta-tokens is the same;

means for computing of a plurality of frequency counts of said plurality of level-wise meta-tokens, wherein each of said plurality of frequency counts is based on a pre-sequence associated with a sequence of a sequence machine of said plurality of sequence machines until the current hop distance;

means for ordering of said plurality of level-wise meta-tokens into a plurality of plurality of ordered level-wise meta-tokens based on said plurality of frequency counts;

means for making of a plurality of ordered level-wise meta-tokens of said plurality of plurality of ordered level-wise meta-tokens as child nodes of a pre-sequence associated with a sequence of said sequence machine;

means for creating of a plurality of level-wise indexed hierarchy 2 of said plurality of level-wise indexes based on said plurality of plurality of ordered level-wise meta-tokens, wherein each of said plurality of level-wise indexed hierarchy 2 is associated with a pre-sequence associated with a sequence of said sequence machine; and means for modifying of said plurality of modified finite state machines by replacing each of said plurality of sub-finite state machines with a meta-token associated with said sub-fine state machine of said plurality of sub-finite state machines or said meta-token followed by star.

* * * * *